UNITED STATES PATENT OFFICE.

GERHARD LOESEKANN, OF HANOVER, GERMANY.

PROCESS OF MAKING ARTIFICIAL CRYOLITE.

969,381.  Specification of Letters Patent.  Patented Sept. 6, 1910.

No Drawing.  Application filed November 30, 1908. Serial No. 465,190.

*To all whom it may concern:*

Be it known that I, GERHARD LOESEKANN, a subject of the Emperor of Germany, residing at Hanover, Germany, have invented new and useful Improvements in Processes of Making Artificial Cryolite, of which the following is a specification.

Cryolite is at present obtained from fluor spar by distilling the purest possible fluor spar with sulfuric acid, and by neutralizing the hydrofluoric acid thus obtained, with aluminium hydroxid and soda. In that process it is necessary to use pure fluor spar if it is desired to obtain pure cryolite. Fluor spar occurring in nature and used in practice always contains, however, silicic acid which appears in the distillate in the form of hydrofluosilicate. The latter is very difficult to separate from the hydrofluoric acid and thus renders the cryolite obtained impure, owing to the presence of hydrofluosilicate. In practice this is remedied by heating the artificial cryolite. The fluosilicate is then decomposed, the fluorid of silicon escapes, but the remaining fluorin salt remains in the cryolite, so that the latter must always contain fluoring salt in excess.

The process described hereinafter has extraordinary advantages over the old process, as it enables a really pure cryolite to be obtained. Even an impure fluor spar can be used for the purpose, which is very important, as it is a matter of great difficulty to get the required large quantities of pure spar.

In "*Comptes Rendus,*" Volume 66, (1868), page 802, a method is described, by which large quantities of fluorid of sodium can be easily obtained, and the reaction in question is based on the equation:

$$CaF_2 + Na_2SO_4 + 4C = 2NaF + CaS + 4CO,$$

or $$CaF_2 + Na_2SO_4 + 2C = 2NaF + CaS + 2CO_2.$$

It is however out of the question to work by the process there described. Fluorid of sodium is soluble with such difficulty that lixivation of the resulting mass is practically impossible. It would be necessary to use such large quantities of water that no advantage over the old process would be obtained. Only by using sulfate of potassium in place of sulfate of sodium, it is possible to make the process suitable for practical purposes, as the fluorid of potassium is easily soluble and even deliquiscent. Fluorid of potassium can then be easily converted into fluorid of sodium by decomposition with sulfate of sodium. The sulfate of potassium obtained goes back into the process. The salt is always recovered, and used again. The fluorid of sodium obtained is treated with the theoretical quantity of sulfate of aluminium and thus readily gives cryolite. This process enables therefor sulfate of aluminium to be used direct, without having first to convert it into aluminium hydroxid.

The following equations illustrate the whole process:

1. $CaF_2 + K_2SO_4 + 4C\, (\text{or } 2C) =$
   $$CaS + 2KF + 4CO\, (\text{or } CO_2).$$
2. $2KF + Na_2SO_4 = 2NaF + K_2SO_4.$
3. $12NaF + Al_2(SO_4)_3 =$
   $$Na_6Al_2F_{12} + 3Na_2SO_4.$$

The sulfate of potassium obtained in accordance with the equation 2 is again used for reaction in accordance with equation 1. The sulfate of sodium obtained in accordance with equation 3 is again used for reaction in accordance with equation 2. When potassium fluorid is brought together in a suitable manner with aluminium sulfate, double compounds are produced in the same way as in the case of sodium fluorid. Cryolite of potassium is however formed much more quickly than sodium cryolite, on account of the solubility of both salts. The former can be converted into the latter by digestion with sodium sulfate. It is therefore also possible to combine the reactions in accordance with the equations 2 and 3, into one single one, which, if done in a suitable manner, offers various advantages to the manufacture:

$$12KF + 3Na_2SO_4 + Al_2(SO_4)_3 = Na_6Al_2F_{12} + 6K_2SO_4.$$

The sulfate of potassium is again used in the manufacture.

The reaction is possible at a temperature of about 600 to 700° C., although the process would be too slow at such a temperature for practical purposes. To complete the process in about one to two hours, a temperature of about 900° C. is required. The more finely the substances are powdered the quicker is the process. If the substances are very coarse-grained, it may not be possible to complete the process at all. Fluorid of potassium is volatile at about 900° C., especially when the mass is stirred. In many cases it may be advisable, therefore, to work with a temperature of 1000° C. or more, in order to volatilize the fluorid of potassium that is being formed.

The basis for the entire cryolite production is the reaction $$CaF_2 + K_2SO_4 + C_4 = CaS + 2KF + 4CO.$$

The following is an example of a process carried through in accordance with the invention: Ten parts fluor spar (a surplus was taken, since the fluor spar was not pure), 8 parts sulfate of potassium, and 5 parts carbon (powdered coke), were passed together through a sieve having apertures of 4 square millimeter size and heated to a temperature of about 1000° to 1100° C. The reaction was easily effected. Part of the potassium fluorid evaporated and was easily condensed from the gases; the remainder was as easily lixiviated from the calcined residue. The produced potassium fluorid was easily soluble in water.

The following is an example of the reaction with sodium sulfate: Fifty-eight parts fluorid of potassium dissolved in 200 parts of boiling water were mixed with 161 parts of calcined sodium sulfate which had also been dissolved in 200 parts of boiling water. The process was then carried on in known manner.

The formation of the precipitate $$2NaF, Na_2SO_4$$

must be guarded against. One part of this double-salt was easily dissolved in about 13 to 14 parts of water.

A conversion of the sodium fluorid with aluminium sulfate is also easy, particularly if the former substance has been made into a paste some time previous to the reaction. The aluminium sulfate is dissolved in such a quantity of water as makes it easily filtered and neutralized.

If the aluminium sulfate used contains free acid the yield of artificial cryolite will be considerably less.

Three parts sodium fluorid and 4.3 parts commercial aluminium sulfate treated with $6\frac{1}{4}$ parts of water, yielded 2.4 parts of cryolite.

As already stated, the process just described enables inferior fluor spar to be used, as no fluo-silicates can be produced; it makes however possible a technical utilization of a mineral which hitherto could scarcely be used, and it does away entirely with the fear that the manufacture of cryolite would ever have to be limited owing to inadequate supply of fluor spar.

I claim:

The herein described process of making artificial cryolite, which consists in calcining the fluor spar with sulfate of potassium and carbon, lixiviating the mass thus obtained with water, treating the solution of fluorid of potassium directly with a solution of sodium sulfate and aluminia sulfate, whereby sodium-aluminium fluorid and potassium sulfate are produced.

GERHARD LOESEKANN.

Witnesses:
N. W. BEHNE,
LUISE KATHER.